Oct. 12, 1971  V. L. CLIFTON  3,611,476
MEAT TENDERIZER
Filed Jan. 2, 1969  2 Sheets-Sheet 1
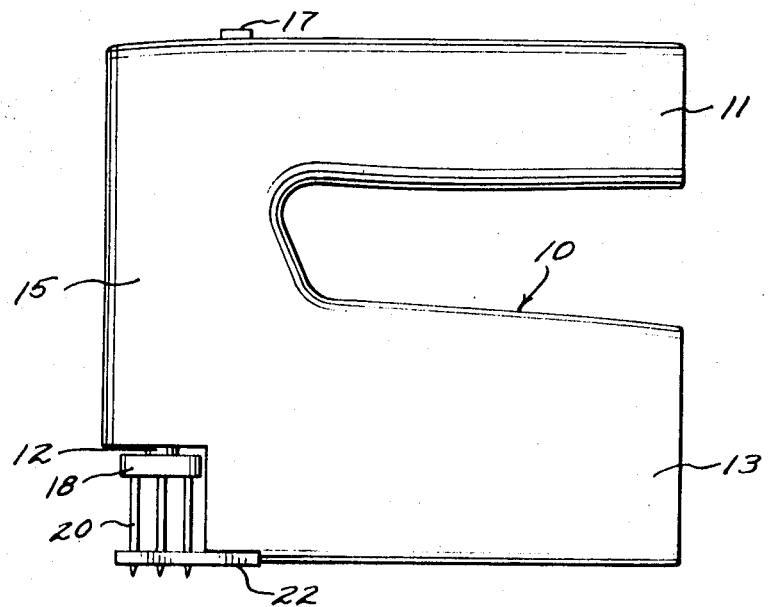
FIG. 1.
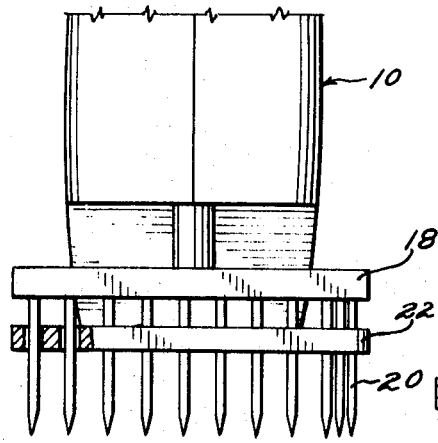
FIG. 2.
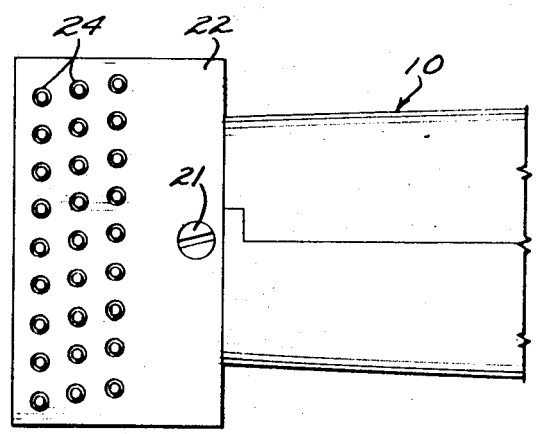
FIG. 3.
FIG. 4.
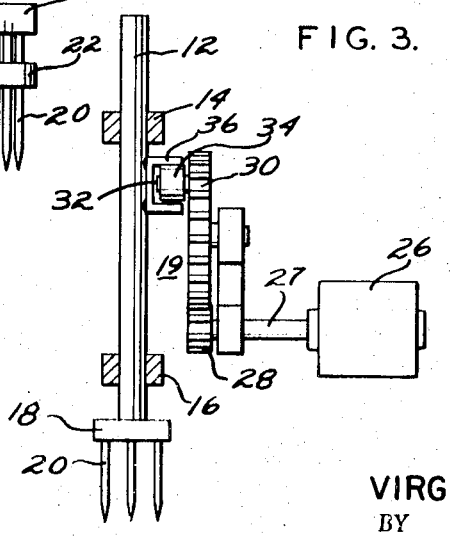
FIG. 5.
INVENTOR.
VIRGINIA L. CLIFTON
BY
Anderson, Spangler & Wymore
ATTORNEYS Oct. 12, 1971 V. L. CLIFTON 3,611,476
MEAT TENDERIZER
Filed Jan. 2, 1969 2 Sheets-Sheet 2
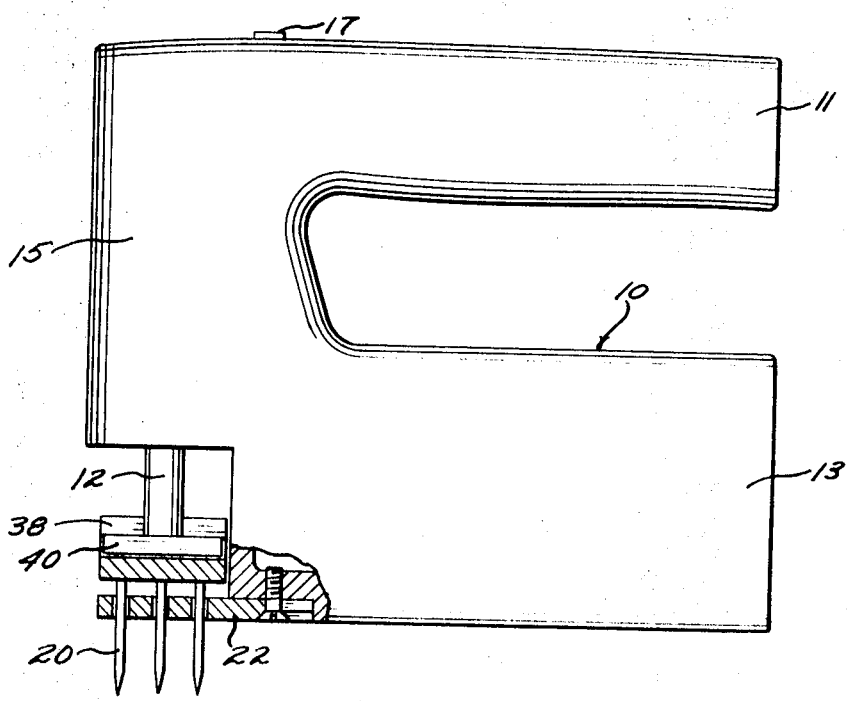
FIG. 6
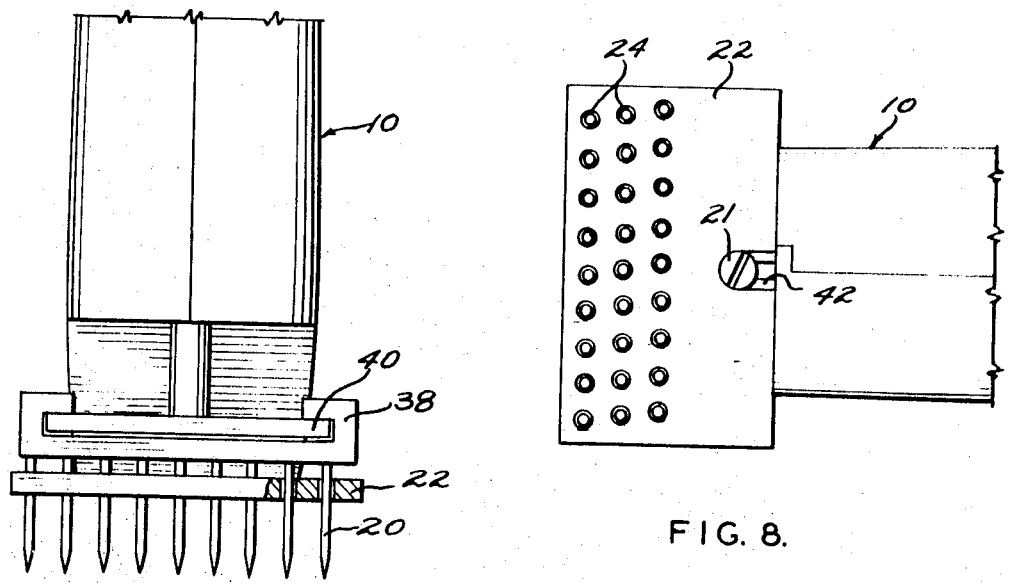
FIG. 7
FIG. 8.
INVENTOR.
VIRGINIA L. CLIFTON
BY
Anderson, Spangler & Dymore
ATTORNEYS United States Patent Office 3,611,476
Patented Oct. 12, 1971

3,611,476
MEAT TENDERIZER
Virginia L. Clifton, 1701 E. Louisiana Ave.,
Denver, Colo. 80210
Filed Jan. 2, 1969, Ser. No. 788,520
Int. Cl. A22c 9/00
U.S. Cl. 17—25                                     7 Claims

ABSTRACT OF THE DISCLOSURE

A portable meat tenderizing device comprising a reciprocating shaft with a multiple spiked element attached to the base thereof and a porous plate positioned below the spiked element through which the spikes pass in a reciprocating action. Thus, the reciprocating spikes exert a tenderizing action by repeatedly perforating the meat.

BACKGROUND OF THE INVENTION

(1) Field of the invention

The present invention relates generally to a means of tenderizing meats and more particularly to apparatus which tenderize meat by a reciprocal perforating action.

(2) Description of the prior art

The prior art is replete with various and sundry devices for tenderizing meat. Many of these have not proved completely satisfactory due to their bulkyness, and generally unreliable nature. Some are very complex in structure and necessarily quite expensive.

Many prior devices employ the reciprocating teeth or spike principle to penetrate the meat. Note in particular the patents to Stukart 2,339,890, Estes 2,520,032 and Brown 2,816,320. However, the present invention employs a stationary plate having a plurality of holes through which the teeth or spikes pass in a reciprocating motion and this innovation does not appear to be disclosed in the prior art.

SUMMARY OF THE INVENTION

The present invention is a meat tenderizing device comprising a reciprocating shaft wth a plate havng a plurality of spikes attached to the base end thereof. The spikes are adapted to repeatedly pass through a porous plate positioned adjacent and below the spiked plate in a reciprocating action. By repeatedly penetrating the meat with the spikes, a tenderizing effect is achieved. While a reciprocating action is apparently a principle which has been used in prior devices, the use of a separate fixed plate with a plurality of holes through which the spikes repeatedly pass in novel.

STATEMENT OF THE OBJECTS OF INVENTION

An object of this invention is to provide a new and improved apparatus for tenderizing meat.

Another object is to provide a relatively small meat tenderizing apparatus that is portable and economic in operation.

Another object is to provide a meat tenderizing device capable of being easily cleaned after use thereof.

A further object is to provide a meat tenderizing device which employs a reciprocating motion to repeatedly pass pointed spikes through a porous plate and thus penetrate or perforate meat.

Other objects, advantages, and novel features of the invention will become apparent from the following detailed description of the invention when considered in conjunction wth the accompanying drawings.

BRIEF DESCRIPTION OF THE DRAWINGS

FIG. 1 is a side elevational view of the present invention.

FIG. 2 is an enlarged front view partially in section of the reciprocating shaft with the multiple skiped element attached thereto and the spikes positioned in the holes of the perforated plate.

FIG. 3 is an enlarged bottom view of the perforated plate illustrating the holes therein and the screw which holds the plate in position.

FIG. 4 is a schematic view showing the gear means which connect the shaft with the motor and impart a reciprocating motion thereto.

FIG. 5 is an enlarged elevational view showing the shaft and a lower bearing through which the shaft passes.

FIG. 6 is an elevational view similar to FIG. 1 partially in section but showing a separate element with the pointed spikes attached thereto.

FIG. 7 is an enlarged elevational view partially in section showing the separate multiple spiked element in detail.

FIG. 8 is a bottom view of the perforated plate similar to FIG. 3 but showing a central slot in which an attaching screw is positioned.

DESCRIPTION OF THE PREFERRED EMBODIMENT

Referring now to the drawings, there is shown in FIGS. 1 through 5 one particular embodiment of the present invention comprising in combination a housing 10 formed into an upper handle portion 11, a lower body portion 13 and a forward portion 15. The forward portion carries therein a shaft 12 vertically supported and positioned for reciprocating movement in upper and lower bearings 14 and 16 respectively. The upper handle portion 11 has a motor starter button 17 located on the top thereof and is operatively connected to motor 26 positioned in the lower body portion 13. Also, within the body portion 13 is a gear train 19 which extends into the forward portion 15 of the cover 10 and is attached to the shaft 12.

A plate 18 supporting a plurality of integrally attached spikes 20 is secured to shaft 12 by a screw not illustrated in the drawings which passes through plate 18 and threads into shaft 12. However, any conventional means may be used for connecting shaft 12 and plate 18.

A fixed base plate 22 having a multiplicity of regularly spaced holes 24 is attached to the bottom of housing 10 by the flatheaded screw 21 and is positioned just below plate 18. The spikes 20 attached to plate 18 are designed to repeatedly pass through the holes 24 in a reciprocating movement. As shown in FIG. 4, the reciprocating action of the present device is created by the motor 26 operatively connected by shaft 27 to gear 28 which is meshed with a larger gear 30 to which is connected a stub shaft 32 with a bearing 34 received within a channel 36 fixedly secured to the shaft 12. Thus, upon operation of motor 26, the shaft 12 is driven in reciprocating movement within bearings 14 and 16, respectively, by the stub shaft 32.

A second embodiment of the invention is illustrated in FIGS. 6, 7, and 8 and includes a separate detachable member 38 to which the spikes 20 are attached. Member 38 is shaped to fit snugly but detachably over mounting element 40 which is affixed to shaft 12 by a screw or other suitable means, such as welding and the like, not shown.

In this embodiment, base plate 22 is formed with slot 42 which opens exteriorly and in which screw 21 is positioned to hold said base plate 22 against the bottom of the housing substantially as shown in the drawing. However, upon loosening the screw 21, the base plate 22 may be moved forward in a sliding manner and removed. Thus, this embodiment provides for easy removal of both the spikes 20 and the apertured plate 22 in order that both may be adequately cleaned after use.

While some variation may occur, the spikes 20 are designed to protrude a sufficient distance through the hole 24 in operation so that a meat penetration of substantially 5/8 of an inch is obtained.

Thus, it should be evident that in use an operator positions the device over a meat product and moves it uniformly over the meat surface. Since the spikes 20 penetrate the meat, a tenderizing effect is created.

Obviously, many modifications and variations of the present invention are possible in the light of the above teachings. It is, therefore, to be understood that within the scope of the appended claims the invention may be practiced otherwise than as specifically described.

What is claimed is:

1. A meat tenderizing device comprising in combination:
    a housing;
    a shaft vertically positioned in said housing;
    a pair of spaced bearings positioned in the housing and adapted to receive the vertically disposed shaft for reciprocal motion thereof;
    a shaft element having a plurality of spikes thereon attached to the base of said shaft;
    a single base plate having a plurality of apertures therein positioned below said spiked element and rigidly attached to the housing against vertical movement between said base plate and said housing, said spikes of the shaft element being positioned and adapted to be reecived in the apertures in a reciprocating motion; and
    means of imparting a rapid reciprocating motion to said shaft, thus said spikes being driven in a rapid reciprocating motion through the apertures of the base plate.

2. The device of claim 1 wherein the housing is formed in the shape of a handle to provide portability thereto.

3. The device of claim 1 wherein said spikes are adapted to protrude through the opposite side of said base plate apertures a distance of at least substantially 5/8 of an inch in operation.

4. The device of claim 1 wherein said shaft element is detachably mounted on said shaft and, wherein
    said base plate is slotted and is affixed to the housing by means positioned in said slot and threaded into said housing, and upon release thereof the base plate is removable for cleaning.

5. In a meat tenderizing device having a housing with a handle formed therein, a shaft vertically positioned in said housing and supported for reciprocatiig motion within a pair of spaced bearings and means mounted in said housing for imparting a reciprocating motion to said shaft, the improvement comprising:
    a shaft having a plurality of spikes thereon attached to the base of said shaft and,
    a single base plate having a plurality of apertures therein positioned below said spiked element and rigidly attached to the housing against vertical movement between said base plate and said housing, said spikes of the shaft element designed to pass within said apertures in a reciprocating motion.

6. The device of claim 5 wherein said spikes are adapted to protrude through the opposite side of said base plate apertures a distance of at least substantially 5/8 of an inch in operation.

7. The device of claim 5 wherein said shaft element is detachably mounted on said shaft and, wherein
    said base plate is slotted and is affixed to the housing by a flatheaded screw positioned in said slot and threaded into said housing and upon release of said screw the base plate is removable for cleaning.

References Cited

UNITED STATES PATENTS

| | | | |
|---|---|---|---|
| 2,520,032 | 8/1950 | Estes | 17—25 |
| 2,688,151 | 9/1954 | Komarik et al. | 17—25 |
| 2,830,317 | 4/1958 | Fleiss | 17—25 |
| 3,490,664 | 1/1970 | Boultinghouse | 83—2 |

LUCIE H. LAUDENSLAGER, Primary Examiner

U.S. Cl. X.R.

83—2